United States Patent
Niekamp et al.

(10) Patent No.: US 10,954,949 B2
(45) Date of Patent: Mar. 23, 2021

(54) TURBOCHARGER WITH CONTROL DEVICE

(71) Applicant: Mahle International GmbH, Stuttgart (DE)

(72) Inventors: Peer Niekamp, Leutenbach (DE); Mathis Wachtler, Wernau (DE); Manuel Zahlecker, Neuhausen (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/630,307

(22) PCT Filed: Jul. 5, 2018

(86) PCT No.: PCT/EP2018/068173
§ 371 (c)(1),
(2) Date: Apr. 10, 2020

(87) PCT Pub. No.: WO2019/011762
PCT Pub. Date: Jan. 17, 2019

(65) Prior Publication Data
US 2020/0240423 A1   Jul. 30, 2020

(30) Foreign Application Priority Data
Jul. 12, 2017   (DE) ...................... 10 2017 211 938.1

(51) Int. Cl.
*F04D 27/00* (2006.01)
*F02B 37/16* (2006.01)
(Continued)

(52) U.S. Cl.
CPC .......... *F04D 27/002* (2013.01); *F02B 37/162* (2019.05); *F02B 37/183* (2013.01);
(Continued)

(58) Field of Classification Search
CPC ...... F02B 37/162; F02B 37/183; F02B 37/22; F02B 37/24; F04D 27/002; F04D 27/009;
(Continued)

(56) References Cited

U.S. PATENT DOCUMENTS 4,382,241 A * 5/1983 Hehl ..................... H01F 7/1607
                                                   335/153
5,894,180 A    4/1999 Volz et al.
(Continued)

FOREIGN PATENT DOCUMENTS

CN        106666980 A     5/2017
DE     102007022192 A1   11/2008
(Continued)

OTHER PUBLICATIONS

English abstract for DE-202010013887.
(Continued)

*Primary Examiner* — Jesse S Bogue
(74) *Attorney, Agent, or Firm* — Fishman Stewart PLLC

(57) ABSTRACT

A control device for mechanically actuating a component may include a housing surrounding a housing interior, at least one fastening sleeve integrally disposed on the housing, and at least one connection opening disposed at the at least one fastening sleeve. The at least one fastening sleeve may surround a fastening opening into which a pin-shaped fastening element may be insertable. One end of the at least one connection opening may lead to a sleeve inner side. The at least one fastening sleeve may be arranged at a housing outer side. The fastening opening may extend outside of the housing interior. Another end of the at least one connection opening may lead to a housing inner side. The at least one connection opening may be covered on the housing inner side via a membrane penetrable by gas and impenetrable by liquid.

21 Claims, 4 Drawing Sheets

(51) Int. Cl.
*F02B 37/18* (2006.01)
*F02B 37/22* (2006.01)
*F02B 37/24* (2006.01)

(52) U.S. Cl.
CPC .............. *F02B 37/22* (2013.01); *F02B 37/24* (2013.01); *F04D 27/009* (2013.01); *F05B 2220/40* (2013.01)

(58) Field of Classification Search
CPC ............ F05B 2220/40; F01L 2009/043; F01L 2009/0463; F01L 9/04; F01N 2390/02; F01N 3/222; F01N 3/30; F02M 26/53; F02M 26/54; H01F 7/129; H01F 7/1607; Y02T 10/12; Y02T 10/144; Y02T 10/20
See application file for complete search history.

(56) References Cited

U.S. PATENT DOCUMENTS

| | | | | |
|---|---|---|---|---|
| 6,180,875 B1 * | 1/2001 | Baur | ...................... | H05K 5/068 174/17 CT |
| 9,353,757 B2 * | 5/2016 | Jones | ...................... | F04B 9/103 |
| 9,903,269 B2 * | 2/2018 | Bonanno | ................ | F02B 39/00 |
| 9,970,337 B2 * | 5/2018 | Herrmann | .............. | F02M 26/53 |
| 10,125,891 B2 * | 11/2018 | Bonanno | ................ | F02B 37/16 |

FOREIGN PATENT DOCUMENTS

| | | |
|---|---|---|
| DE | 202010013887 U1 | 1/2012 |
| DE | 10 2010 063 356 A1 | 6/2012 |
| DE | 10 2016 206 953 A1 | 10/2017 |
| EP | 0 797 858 B1 | 10/2000 |
| EP | 1 450 020 A2 | 8/2004 |

OTHER PUBLICATIONS

English abstract for DE-102007022192.
English abstract for DE-10 2010 063 356.
English abstract for DE-10 2016 206 953.
English abstract for CN106666980.
Chinese Office Action dated May 29, 2020 for copending Chinese Application No. 201880046501X (and English translation).

* cited by examiner

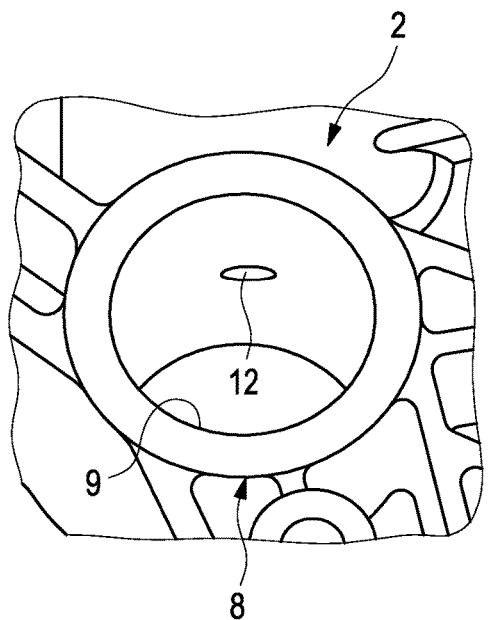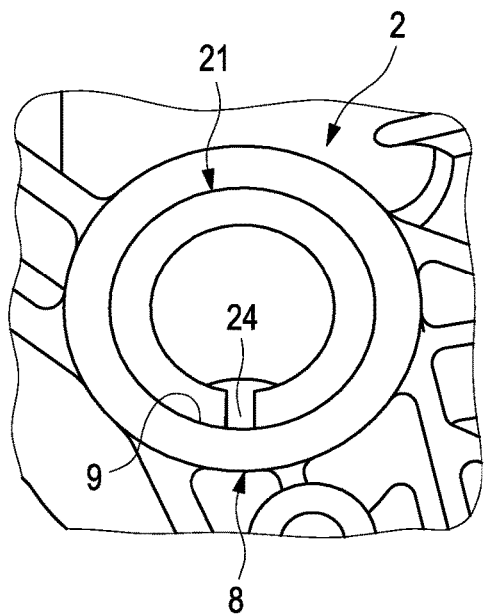
Fig. 3     Fig. 4
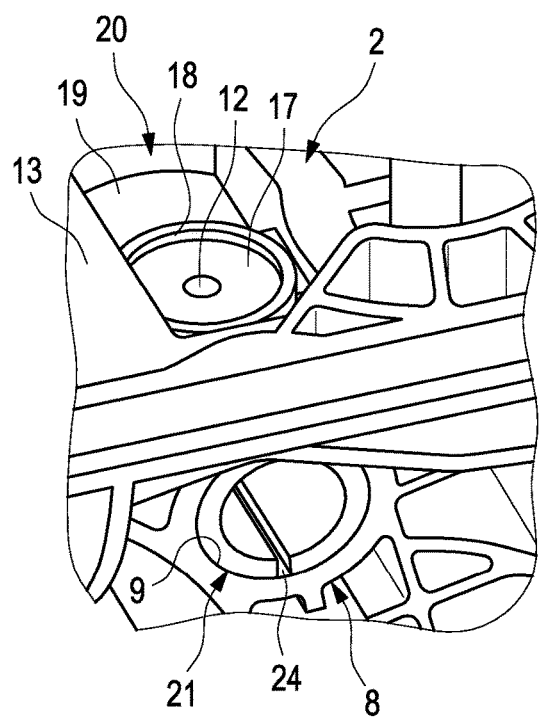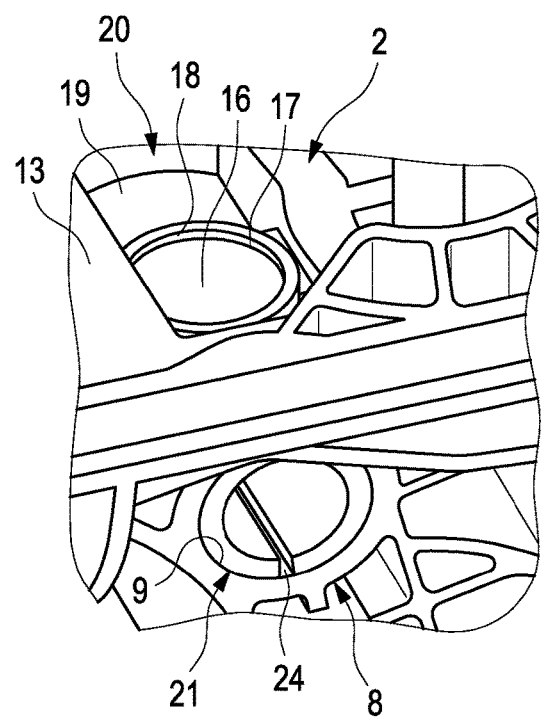
Fig. 5     Fig. 6

TURBOCHARGER WITH CONTROL DEVICE

CROSS-REFERENCE TO RELATED APPLICATIONS

This application claims priority to International Patent Application No. PCT/EP2018/068173, filed on Jul. 5, 2018, and German Patent Application No. DE 10 2017 211 938.1, filed on Jul. 12, 2017, the contents of both of which are hereby incorporated by reference in their entirety.

TECHNICAL FIELD

The present invention relates to a control device for mechanically actuating a component, such as for example a waste gate valve or a variable turbine geometry in an exhaust-gas turbocharger. The invention relates furthermore to an exhaust-gas turbocharger equipped with such a control device. The invention also relates generally to an assembly which has a component to be actuated mechanically and such a control device.

BACKGROUND

Control devices which come into use for mechanically actuating a component represent an actuator and contain a motor in a housing, this preferably being an electric motor. Accordingly, power electronics for actuating and controlling the electric motor are also frequently accommodated in the housing. The motor serves for mechanically actuating a control element, which in turn can be mechanically coupled with the component which is to be actuated. Depending on the location of use of the control device, an ambient temperature of an environment of the control device can vary. As the housing interior surrounded by the housing is generally constant, the pressure in the housing interior varies thereby. To prevent damage at or in the housing, it is expedient to provide for a pressure equalization between the environment and the housing interior. For this, it is basically possible to provide a pressure equalization opening on the housing, which leads to a housing inner side at one end and to a housing outer side at the other end and thereby fluidically connects the housing interior with the environment. In order to now prevent an entry of dirt through the pressure equalization opening into the housing interior, the pressure equalization opening at the housing outer side can be covered with a membrane which is penetrable for gas, whereas it is impenetrable for liquid.

It has been found that in particular in vehicle applications the possibility exists that the vehicle is also cleaned with a high pressure cleaner in the region of the control device, in which the surfaces which are to be cleaned are acted upon with a high pressure jet of liquid or gaseous cleaning agent. Hereby, the risk arises that the pressure equalization opening or respectively the membrane is directly exposed to this high pressure jet, which can lead to damage of the membrane or respectively to a penetration of the cleaning agent which is used into the housing interior.

From DE 20 2010 013 887 U1 a generic control device is known, in which a fastening opening, which is present in any case, which is formed in a fastening sleeve on the housing side and is open to the housing interior, is used for pressure equalization. For this, a connection opening is introduced into a base of the fastening sleeve axially adjoining the fastening opening, so that the housing interior is connected in a communicating manner through the fastening opening and through the connection opening with an environment of the housing. In the case of this control device furthermore a membrane can be dispensed with, because a fastening screw, screwed into the fastening opening, forms with its thread in the fastening sleeve a helical path which is quasi impenetrable for liquid.

From DE 10 2007 022 192 A1 a gear housing is known, in which a pressure equalization opening is closed by a plug which contains a through-opening, which is covered by a membrane.

SUMMARY

The present invention is concerned with the problem of indicating, for a control device of the type described above or respectively for an exhaust-gas turbocharger equipped therewith or respectively for an assembly equipped therewith, an improved embodiment which is distinguished in particular in that the risk of a penetration of undesired contaminants into the housing interior is reduced, while a pressure equalization can take place between the housing interior and the environment.

The invention is based on the general idea of arranging the pressure equalization opening in the form of a connection opening on the housing so that it does not lead to a housing outer side which is directly exposed to the environment. In practice, the invention proposes arranging the connection opening on the housing so that it opens in a fastening opening of a fastening sleeve of the housing. This fastening sleeve is integrally formed on a housing outer side facing away from the housing interior and surrounds the fastening opening, which extends outside of the housing interior. The connection opening, which can also be designated as pressure equalization opening, now leads at one end to a housing inner side facing the housing interior and at the other end to a sleeve inner side facing the fastening opening. As the fastening opening extends outside of the housing interior and is open at least axially at one end as a fastening opening, ultimately through the fastening opening and through the connection opening a fluidic connection is produced between the environment and the housing interior.

Expediently, the respective connection opening between the fastening sleeve and the housing interior can extend within a wall of the housing. Particularly advantageously, provision can be made that the respective connection opening extends between the housing inner side and the sleeve inner side entirely within a wall of the housing. Both measures ensure a continuous connection opening in all mounting states of the housing. Preferably, the connection opening runs here between the housing interior and the fastening opening within a continuous wall of the housing, wherein said wall of the housing separates the housing interior from the environment. A continuous wall in the region or portion of the connection opening is then present when the wall is undivided along the connection opening, therefore is produced from a single piece. This wall or respectively the housing is formed by a material which can preferably be a plastic. This means that the connection opening between the housing interior and the fastening opening is surrounded by the material of the housing, so that the connection opening extends within a continuous, therefore undivided portion of the wall.

An advantageous embodiment is distinguished in that the respective connection opening in the case of a multi-part housing is arranged on a housing part of the housing spaced apart from every other housing part of the housing. This also supports a reliable provision of the connection opening independently of the mounting state of the housing. Expediently, provision can be made that the housing is configured having several parts and has at least two housing parts, wherein one housing part is connected via a contact contour to another housing part. In the case of such a multi-part housing, advantageously at least one such connection opening is formed in at least one of the housing parts. The connection opening is arranged here on the respective housing part, spaced apart with respect to the contact contour. In other words, the connection opening extends within a wall of the housing part spaced apart from one or from each further housing part adjoining thereto. A multi-part housing can be formed for example by a base body and a cover.

The fastening opening, in connection with a pin-shaped fastening element, can serve to fasten the housing to a periphery of the control device. In this case, the fastening opening can be configured expediently as a through-opening. It is likewise conceivable to use the fastening opening in connection with a pin-shaped fastening element for fastening a first housing part of the housing to a second housing part of the housing. In this case, the fastening opening can be configured as a through-opening which is open axially on both sides, or as a blind hole, which is open axially only on one side. In addition, it is conceivable to fasten the housing at a periphery of the control device with the respective fastening element through a through-opening of the first housing part and through a further through-opening of the second housing part, so that the second housing part is clamped between the first housing part and the periphery. At least one of these through-openings can be configured here as a fastening opening with connection opening.

In the mounted state, in which for example the housing is fastened at the periphery, said pin-shaped fastening element, such as for example a bolt or a screw or a threaded pin, is directed through the fastening sleeve. The axial end of the fastening opening, in this case expediently configured as a through-opening, facing the periphery, is then largely closed by the periphery. The axial end of the through-opening, facing away from the periphery, is then largely closed by a component of the fastening element, e.g. a head. Otherwise, the continuous fastening opening is largely filled by the fastening element. However, the continuous fastening element is thereby not separated from the environment in a tight manner, rather thereby a gas exchange and therefore in particular a pressure equalization between the environment and the fastening opening and therefore via the connection opening also a pressure equalization between the environment and the housing interior is still possible. The risk that liquid penetrates through the connection opening into the housing interior is also very small in the case of a direct action upon the fastening sleeve by a jet of a high pressure cleaner. The same then also applies for the case where two housing parts are fastened to one another, or the case where two housing parts are fastened to one another and to the periphery.

According to the invention, the connection opening can be covered at the housing inner side by a membrane which is penetrable for gas and impenetrable for liquid. The membrane can be fixed to the housing inner side in a suitable manner, for example by means of an adhesive connection or by means of a clip connection. By means of the membrane, the risk of an entry of dirt in the housing interior is reduced. The risk of damage to the membrane is reduced through its positioning on the housing inner side.

The membrane can be formed with PTFE or can consist thereof. PTFE stands here for polytetrafluoroethylene or polytetrafluoroethene. Such a PTFE membrane is distinguished by a particularly high temperature resistance.

An advantageous embodiment makes provision that a depression for receiving the membrane is formed on the housing inner side. The membrane therefore does not form any interfering contour in the housing interior. In particular, the membrane can be arranged in a recessed manner in the depression.

A further development makes provision that the connection opening within the depression opens spaced apart from a depression edge surrounding the depression. This construction simplifies in particular the mounting of the membrane.

The membrane can preferably extend laterally up to the depression edge. This measure also facilitates the mounting of the membrane.

An embodiment is particularly expedient, in which the depression is formed at the bottom of a recess which is formed on the housing inner side. Hereby, the membrane can be accommodated within the depression in a particularly space-saving manner in the housing interior.

Expediently, the membrane overlaps the connection opening laterally. Consequently, the connection opening opens spaced apart from a membrane edge surrounding the membrane. In this way, a complete closing of the orifice of the connection opening, facing the housing interior, is ensured by the membrane.

Expediently, an axial groove can be formed on the sleeve inner side, in which axial groove the connection opening opens. The axial groove extends preferably up to one of the axial ends of the fastening sleeve. In particular, the axial groove extends over the entire length of the fastening opening and therefore over the entire length of the fastening sleeve. Consequently, the axial groove extends from the one axial end up to the other axial end of the fastening sleeve. In both cases, the fluidic connection between the environment and the connection opening within the fastening sleeve is improved, even when the fastening opening is largely filled by the respective fastening element.

Another embodiment makes provision that a support sleeve, which is separate with respect to the fastening sleeve, is inserted into the fastening opening, via which support sleeve the respective fastening element rests against the periphery in the fitted state, in which the housing is fastened to the periphery. Such a support sleeve comes into use particularly when the housing is made from plastic. The support sleeve is then expediently made from metal. The entire forces which are transferred from the respective fastening element to the periphery can be received in this way by the support sleeve, so that the housing is relieved therefrom.

Expediently, the support sleeve can be formed integrally on the periphery. In this case, the support sleeve brings about simultaneously a positioning between housing and periphery.

However, an embodiment is preferred, in which the support sleeve is configured as a separate component with respect to the periphery. The support sleeve can then be pre-mounted on the housing in a simple manner.

In a further development, the support sleeve can have a continuous longitudinal slot. The longitudinal slot is expediently rectilinear and extends axially over the entire length of the support sleeve and penetrates the support sleeve radially. Hereby, the support sleeve is radially spring-elastic. Consequently, the support sleeve can be introduced more easily into the fastening opening. In particular, also a press-fit can be realized between support sleeve and fastening opening.

Even when the support sleeve extends over the outer orifice of the connection opening facing the fastening opening, it can generally not seal it completely, so that a pressure equalization is still possible. With a radially prestressed support sleeve, however, the embodiment with the axial groove is preferred, in order to promote the pressure equalization.

An exhaust-gas turbocharger according to the invention is equipped with a component which is to be actuated mechanically, such as for example with a variable turbine geometry or with a waste gate valve, and has a control device of the type described above for mechanically actuating this component. Provision is made here that a housing portion of the exhaust-gas turbocharger has or forms a periphery on which the control device is fastened. A variable turbine geometry usually comprises several guide blades distributed along an inlet cross-section. The inlet cross-section leads to a turbine wheel of a turbine of the exhaust-gas turbocharger. The guide blades are adjustable with regard to their attack angle. For adjusting the guide blades, a guide blade adjustment device is provided, which in turn can be actuated by an actuating element. A control element of the control device is coupled mechanically with this actuating element. A waste gate valve serves for controlling a bypass, which bypasses a turbine wheel within the turbine. A valve element of the waste gate valve can be coupled with an actuating element. A control element of the control device is coupled mechanically with this actuating element. The waste gate valve and variable turbine geometry serve respectively for the power control of the turbine and therefore of the exhaust-gas turbocharger.

Expediently, the control device has an electric motor, which is arranged in the housing interior. The control device can have, in addition, a control element arranged externally on the housing, which is drivingly coupled with the electric motor. Preferably, a gear is arranged in the housing interior, which gear couples the electric motor mechanically with the control element.

An assembly according to the invention, which preferably comes into use in a motor vehicle and/or on an internal combustion engine, comprises a component which is to be actuated mechanically, such as for example a throttle flap or an exhaust flap, and a control device of the type described above, by means of which the respective component can be actuated mechanically. Furthermore, provision is made that the assembly has or forms the periphery on which the control device is fastened.

Further important features and advantages of the invention will arise from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically,

FIG. 3 shows an isometric view of the control device in the region of a fastening sleeve without support sleeve, FIG. 4 shows an isometric view of the control device in the region of the fastening sleeve with support sleeve, FIG. 5 shows an isometric view of the control device in the region of the connection opening without membrane, FIG. 6 shows an isometric view of the control device in the region of the connection opening with membrane, FIGS. 7 to 10 respectively show a sectional view of the control device in the region of the fastening sleeve in different embodiments, FIGS. 11 to 13 respectively show a simplified sectional view of the control device in the region of the fastening sleeve in the fitted state in various embodiments.

DETAILED DESCRIPTION

Figure 1:
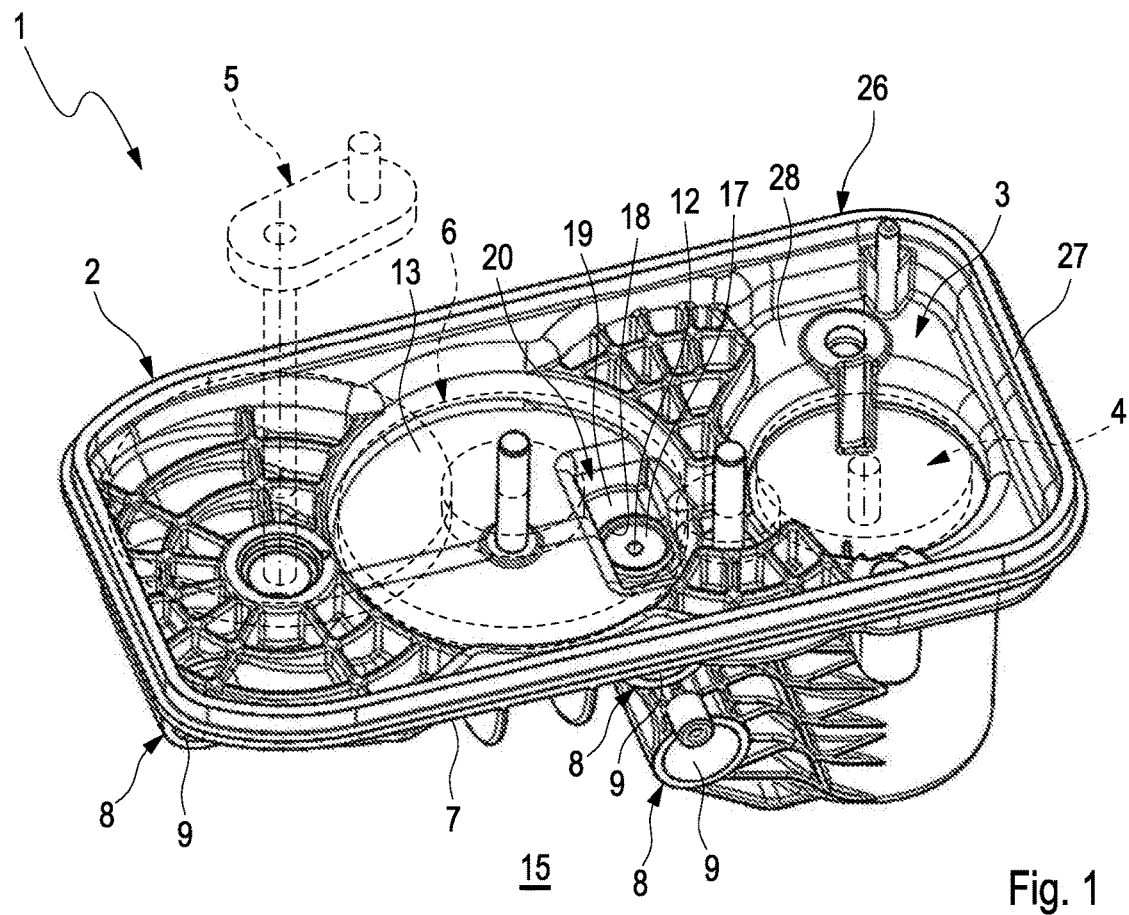
FIG. 1 shows an isometric view onto an only partially illustrated control device.

According to FIG. 1, a control device 1 comprises a housing 2, only partially illustrated here, which surrounds a housing interior 3. The housing 2 serves in particular to receive an electric motor 4, indicated here only by a broken line, for driving a control element 5, likewise indicated only by a broken line. Whereas the electric motor 4 is arranged in the housing interior 3, the control element 5 is situated externally on the housing 2. The drive connection between electric motor 4 and control element 5 takes place expediently via a single-stage or multi-stage gear 6, which is likewise indicated here only by a broken line.

Figure 2:
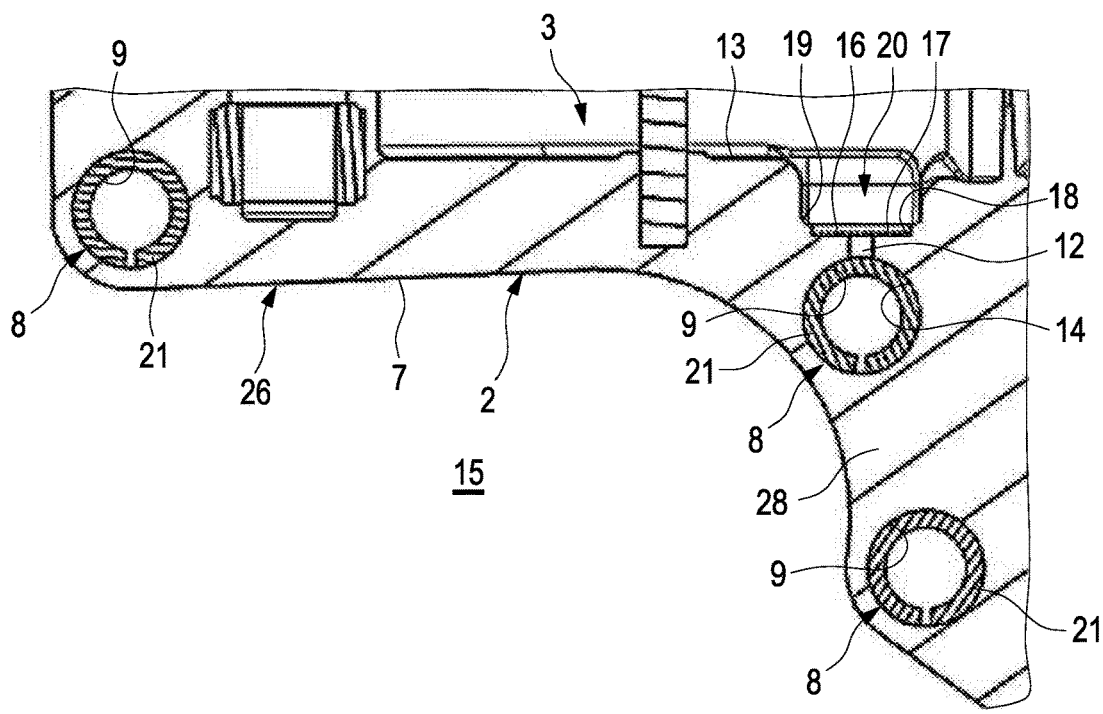
FIG. 2 shows a sectional view of the control device in the region of a connection opening.
Figure 11:
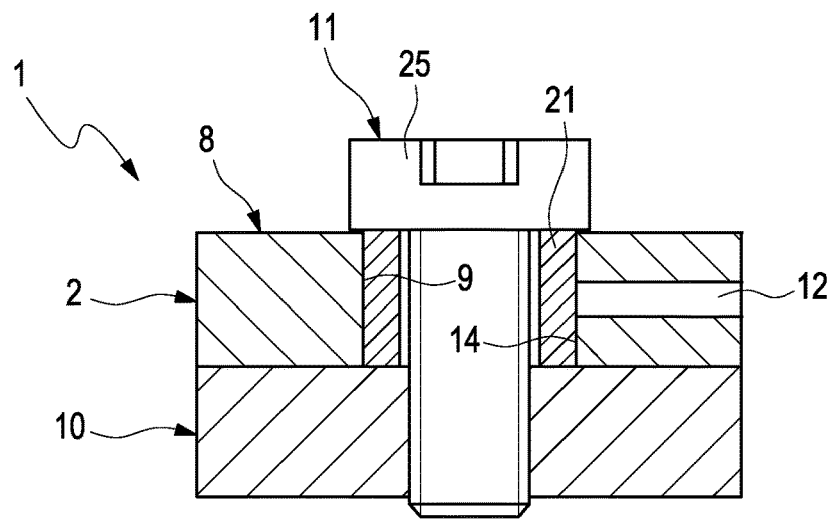
Figure 12:
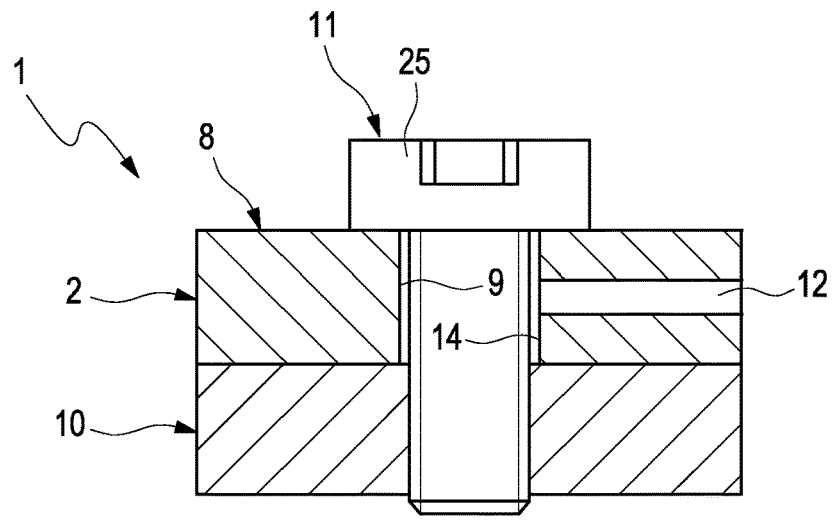
Figure 13:
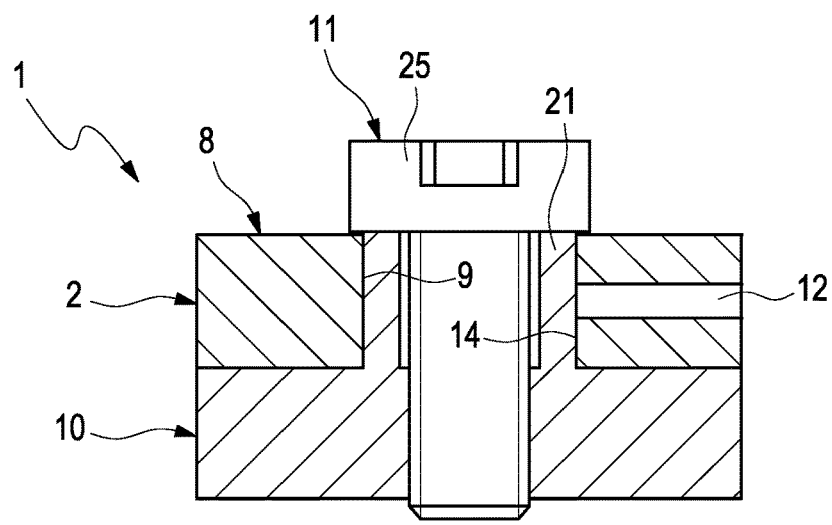

According to FIGS. 1 and 2, the housing 2 has at least one fastening sleeve 8 on a housing outer side 7 facing away from the housing interior 3. In the example which is shown, three such fastening sleeves 8 are provided. The respective fastening sleeve 8 is formed here integrally on the housing 2. Furthermore, the respective fastening sleeve 8 surrounds respectively a fastening opening 9, which in the example shown here is configured as a through-opening. Each fastening opening 9 is arranged here entirely outside of the housing interior 3. For fastening the housing 2 at a periphery 10, indicated in FIGS. 11 to 13, a pin-shaped actuating element 11, likewise only indicated in FIGS. 11 to 13, is able to be directed through the respective fastening opening 9. The respective fastening opening 9 is configured here so as to be cylindrical, in particular circular-cylindrical.

At least one of these fastening sleeves 8, here the central of the three fastening sleeves 8, is in contact with a connection opening 12. This connection opening 12 can also be designated as pressure equalization opening 12. The connection opening 12 leads at one end to a housing inner side 13 facing the housing interior 3, and at the other end to a sleeve inner side 14 facing the fastening opening 9. Hereby, a fluidic connection is created between the housing interior 3 and an environment 15 of the control device 1.

The housing 2 can be expediently configured having several parts. In FIGS. 1 and 2, only a single housing part 26 is illustrated, which forms for example a base body, which can be closed by a further housing part, configured as a cover, which is not illustrated here. Instead of a two-part housing 2, three- or multiple-part housings 2 are also conceivable. The respective housing part 26 has a contact contour 27, via which a further housing part, such as e.g. the above-mentioned housing part configured as a cover, is able to be adjoined, in order to form the housing 2. The housing 2 or respectively the housing part 26 has a wall 28, which separates the housing interior 3 from the environment 15. This wall 28 is configured continuously within the respective housing part 26.

The respective connection opening 12 is now arranged spaced apart or respectively remote from the contact contour 27 on the housing part 26 and extends within the wall 28. Thereby, the connection opening 12 is also arranged spaced apart from all other housing parts which may be present. Between the housing interior 3 and the fastening sleeve 8 the connection opening 12 is surrounded by the continuous material of the wall 28.

According to FIG. 6, the connection opening 12 can be covered on the housing inner side 13 by a membrane 16. The membrane 16 is penetrable for gas and substantially impenetrable for liquid and for solids. The membrane 16 can be glued or clipped to the housing inner side 13. Likewise, other fastening methods are conceivable. Expediently, the membrane is formed by means of PTFE. Preferably, the membrane 16 consists of PTFE.

FIGS. 5 and 6 show the same view, once with membrane 16 (FIG. 6) and once without membrane 16 (FIG. 5).

According to FIGS. 1, 2, 5 and 6, a depression 17 for receiving the membrane 16 can be formed on the housing inner side 13. Expediently, the depression 17 is dimensioned larger than the inner orifice of the connection opening 12 formed on the housing inner side 13. In particular, the connection opening 12 can open within the depression 17 spaced apart from a depression edge 18 surrounding the depression 17. In particular, the said inner orifice of the connection opening 12 is arranged centrally in the depression 17. According to FIG. 6, the membrane 16 can extend laterally up to the depression edge 18. Therefore, the membrane 16 overlaps the centrally arranged connection opening 12 laterally. In this way, a reliable covering of the connection opening 12 by the membrane 16 can be guaranteed.

Expediently here the depression 17 can be coordinated with the membrane 16 so that the membrane 16 is arranged in a recessed manner in the depression 17. In other words, a thickness of the membrane 16 is maximally the same size as, but preferably smaller than, a depth of the depression 17. Hereby, the membrane 16 can not form an interference contour in the housing interior 3, which protects it from damage.

It can be further seen from FIGS. 1, 2, 5 and 6 that the depression 17 is expediently formed on the bottom 19 of a recess 20 which is formed on the housing inner side 13. Hereby, the depression 17 with membrane 16 can be accommodated in the housing interior 3 in a particularly space-saving manner.

According to FIGS. 2, 4 to 11 and 13, a support sleeve 21 can be inserted into the fastening opening 9, which support sleeve represents a separate component with respect to the fastening sleeve 8. The support sleeve according to FIGS. 2 to 4 and 7 to 10 and 11 and 13 can cover here an outer orifice of the connection opening 12 facing the fastening opening 9. FIGS. 3 and 4 show the same view, wherein in FIG. 3 the support sleeve 21 is omitted, so that the outer orifice of the connection opening 12 can be seen, whereas in FIG. 4 the support sleeve 21 is inserted, so that the outer orifice of the connection opening 12 is covered.

Figure 7:
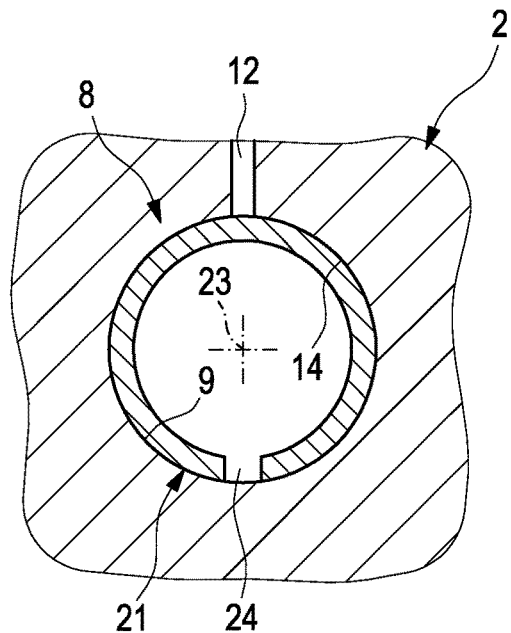
Figure 8:
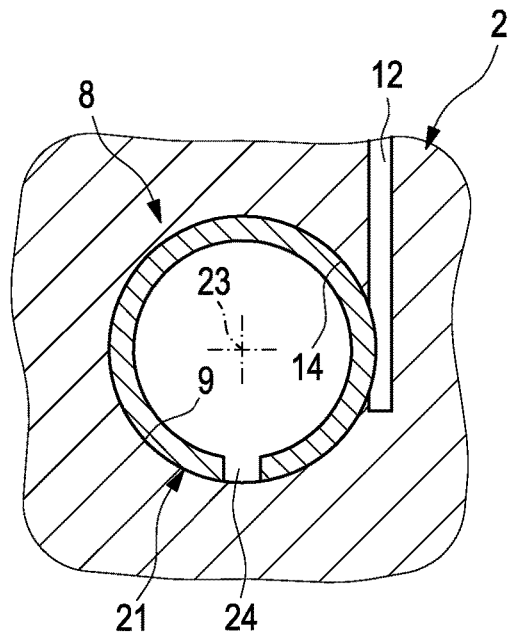
Figure 9:
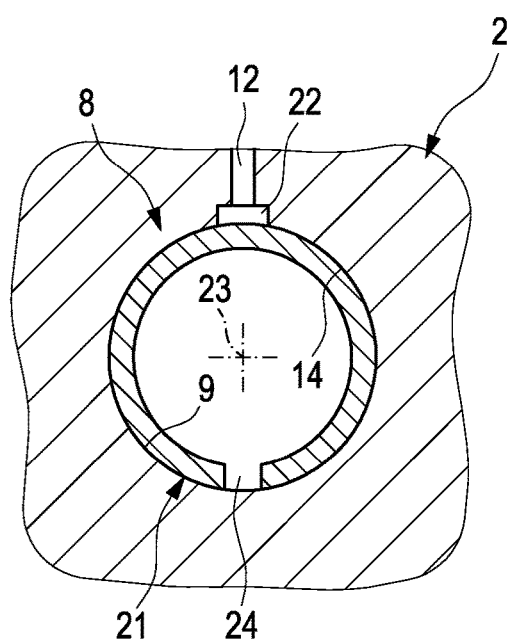
Figure 10:
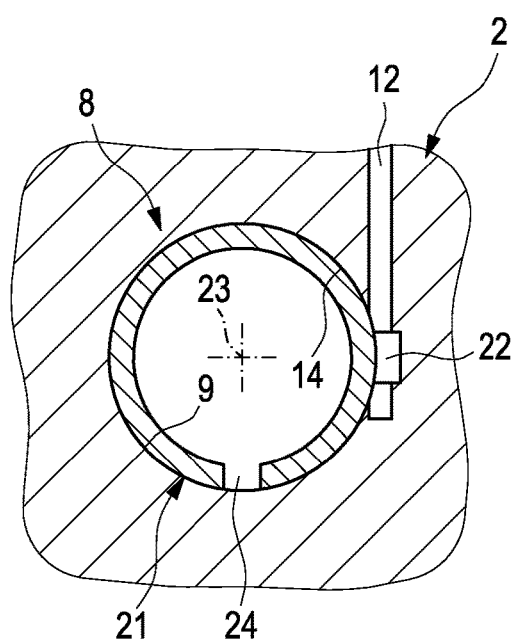

According to FIGS. 7 to 10, the respective connection opening 12 can be brought to the fastening opening 9 is various ways, so that it then opens at the sleeve inner side 14. Purely by way of example, FIG. 7 shows an embodiment in which the connection opening 12 adjoins the fastening opening 9 radially with respect to a longitudinal centre axis of the fastening opening 9. FIG. 8, on the other hand, shows an example in which the connection opening 12 adjoins the fastening opening 9 tangentially. According to FIGS. 9 and 10, an axial groove 22 can be formed on the sleeve inner side 14, in which axial groove the connection opening 12 opens. Expediently, the axial groove 22 extends parallel to the longitudinal centre axis 23 of the fastening opening, which is configured here so as to be cylindrical. Preferably, the axial groove 22 extends over the entire axial length of the fastening opening 9. Basically, provision can also be made that the axial groove 22 extends only up to one of the two axial ends of the fastening opening 9. Furthermore, provision can also be made that the connection opening 12 according to FIG. 9 opens radially to the fastening opening 9 in the axial groove 22. Likewise, according to FIG. 10 provision can be made that the connection opening 12 opens radially to the fastening opening 9 in the axial groove 12.

With regard to the support sleeve 21, an embodiment is preferred in which the support sleeve 21 also represents a separate component with respect to the periphery 10 shown in FIGS. 11 to 13. Such an embodiment is shown in the examples of FIGS. 2 to 11. In all these examples, the support sleeve 21 preferably has a continuous longitudinal slot 24. Hereby, the support sleeve 21 becomes radially spring-elastic, which facilitates the inserting of the support sleeve 21 into the fastening opening 9.

FIG. 13 shows an embodiment in which the support sleeve 21 is formed integrally on the periphery 10. Here, the support sleeve 21 enables a simplified positioning of the housing 2 on the periphery 10.

It can be seen particularly clearly from FIGS. 11 and 13 how by means of the respective support sleeve 21 the load of the housing 2 by fastening forces, which ultimately secure the control device 1 on the periphery 10, reduces. As can be seen, namely the respective actuating element 11, which in the examples of FIGS. 11 to 13 is configured as a screw, is not supported directly, but rather indirectly, namely via the support sleeve 21 on the periphery 13. Therefore, almost all the fastening forces can be supported on the respective support sleeve 21, whereby the housing 2 is relieved accordingly. For comparison, FIG. 12 shows an embodiment in which no support sleeve 21 comes into use. As can be seen, the respective actuating element 11 must rest here via the housing 2 on the periphery 10, whereby the housing 2 is loaded accordingly. Expediently in the embodiment shown in FIG. 12, the housing 2 is made from metal. In the examples of FIGS. 11 and 13, on the other hand, the housing 2 is preferably made from plastic. The support sleeve 21 is then expediently made from metal. In particular, in FIG. 13 the periphery 10 is made from metal.

Instead of such a screw connection, in which a screw head 25 rests indirectly via a disc, not shown here, or directly on the support sleeve 21 or respectively on the housing 2, another screw connection or connection technique can also come into use. For example, it is also conceivable that a threaded pin projects from the periphery 10, onto which threaded pin a nut is then screwed, which then lies indirectly via a disc or directly on the respective support sleeve 21 or respectively on the housing 2.

The invention claimed is:

1. A control device for mechanically actuating a component, comprising:
a housing surrounding a housing interior;
at least one fastening sleeve integrally disposed on the housing, the at least one fastening sleeve surrounding a fastening opening into which a pin-shaped fastening element is insertable;
at least one connection opening disposed at the at least one fastening sleeve, one end of the at least one connection opening leading to a sleeve inner side;
the at least one fastening sleeve arranged at a housing outer side;
the fastening opening extending outside of the housing interior;
another end of the at least one connection opening leading to a housing inner side; and
wherein the at least one connection opening is covered on the housing inner side via a membrane penetrable by gas and impenetrable by liquid.

2. The control device according to claim 1, wherein the at least one connection opening, between the at least one fastening sleeve and the housing interior, extends within a wall of the housing.

3. The control device according to claim 1, wherein the at least one connection opening, between the housing inner side and the sleeve inner side, extends entirely within a wall of the housing.

4. The control device according to claim 1, wherein:
the housing is a multi-part housing including a plurality of housing parts; and
the at least one connection opening is disposed in a housing part of the plurality of housing parts spaced apart from the other housing parts of the plurality of housing parts.

5. The control device according to claim 1, wherein the membrane at least one of (i) includes PTFE and (ii) is composed of PTFE.

6. The control device according to claim 1, wherein a depression configured to receive the membrane is disposed on the housing inner side.

7. The control device according to claim 6, wherein the at least one connection opening opens within the depression spaced apart from a depression edge surrounding the depression.

8. The control device according to claim 7, wherein the membrane extends laterally up to the depression edge.

9. The control device according to claim 6, wherein the depression is disposed in a bottom of a recess disposed on the housing inner side.

10. The control device according to claim 1, wherein the membrane laterally overlaps the at least one connection opening.

11. The control device according to claim 1, wherein an axial groove is disposed on the sleeve inner side, into which the at least one connection opening opens.

12. The control device according to claim 11, wherein the axial groove extends to an axial end of the fastening opening.

13. The control device according to claim 1, further comprising a support sleeve structured separately from the at least one fastening sleeve, wherein the support sleeve is disposed within the fastening opening, and wherein the pin-shaped fastening element rests axially on the support sleeve when in a mounted state.

14. The control device according to claim 13, wherein the support sleeve is disposed integrally on a periphery of the control device.

15. The control device according to claim 13, wherein the support sleeve is structured as a separate component from a periphery of the control device.

16. The control device according to claim 13, wherein the support sleeve includes a continuous longitudinal slot.

17. The control device according to claim 1, wherein the fastening opening is configured as a through-opening through which the pin-shaped fastening element is directable for fastening the housing on a periphery of the control device.

18. The control device according to claim 1, wherein the fastening opening is configured as a blind hole into which the pin-shaped fastening element is introducible for fastening a first housing part of the housing to a second housing part of the housing.

19. The control device according to claim 1, wherein the fastening opening is configured as a through-opening through which the pin-shaped fastening element is directable for fastening a first housing part of the housing to a second housing part of the housing.

20. An exhaust-gas turbocharger, comprising:
a housing;
a mechanically actuatable component;
a control device according to claim 1 configured to mechanically actuate the component; and
wherein a portion of the housing defines a periphery on which the control device is coupled.

21. An assembly, comprising:
a mechanically actuatable component;
a control device according to claim 1 configured to mechanically actuate the component; and
wherein a component part of the component at least one of includes and defines a periphery on which the control device is coupled.

* * * * *